(12) United States Patent
Prothero et al.

(10) Patent No.: US 9,942,080 B2
(45) Date of Patent: Apr. 10, 2018

(54) COMMUNICATION TECHNIQUES EXPLOITING SPIRAL-BASED WAVEFORM DESIGN FLEXIBILITY

(71) Applicant: Astrapi Corporation, Dallas, TX (US)

(72) Inventors: Jerrold Prothero, Washington, DC (US); Nigel Jones, Frederick, MD (US)

(73) Assignee: Astrapi Corporation, Dallas, TX (US)

( * ) Notice: Subject to any disclaimer, the term of this patent is extended or adjusted under 35 U.S.C. 154(b) by 0 days.

(21) Appl. No.: 14/945,028

(22) Filed: Nov. 18, 2015

(65) Prior Publication Data

US 2016/0149744 A1    May 26, 2016

Related U.S. Application Data

(60) Provisional application No. 62/084,770, filed on Nov. 26, 2014.

(51) Int. Cl.
*H04L 27/00* (2006.01)
*H04L 27/34* (2006.01)

(52) U.S. Cl.
CPC ........ *H04L 27/345* (2013.01); *H04L 27/3405* (2013.01); *H04L 27/3494* (2013.01)

(58) Field of Classification Search
CPC ............ H04L 27/2697; H04L 27/3405; H04B 3/0685; H04B 3/54

USPC ................. 375/259, 219–222, 261, 269, 356
See application file for complete search history.

(56) References Cited

U.S. PATENT DOCUMENTS

| | | | |
|---|---|---|---|
| 8,948,278 B2 * | 2/2015 | Prothero | H04L 27/3405 375/259 |
| 9,258,168 B2 * | 2/2016 | Prothero | H04L 27/3405 |
| 2015/0256380 A1 * | 9/2015 | Jones | H04B 1/001 375/219 |

OTHER PUBLICATIONS

I. Kvecher, et al., "An Analog Modulation Using a Spiral Mapping", 2006 IEEE 24th Convention of Electrical and Electronics Engineers in Israel, pp. 194-198 (5 pgs.).

* cited by examiner

*Primary Examiner* — Khai Tran
(74) *Attorney, Agent, or Firm* — Maier & Maier, PLLC

(57) ABSTRACT

One exemplary embodiment can describe a method for communicating. This can include identifying a set of non-linear functions used to generate waveforms; generating, a plurality of waveforms having substantially identical amplitudes and substantially identical phases, and designating this plurality of waveforms as a plurality of reference signals; encoding at least one bit of traffic data in an attribute of a waveform; selecting a reference symbol ("refbol") that encodes the at least one bit of traffic data; transmitting the refbol as a waveform from a transmitter; receiving the refbol at a receiver; and decoding the refbol.

5 Claims, 1 Drawing Sheet

| (rd0, td0) | (rd0, td1) | (rd0, td0) | (rd0, td1) |
|---|---|---|---|
| (rd1, td0) | (rd1, td1) | (rd1, td0) | (rd1, td1) |
| (rd0, td0) | (rd0, td1) | (rd0, td0) | (rd0, td1) |
| (rd1, td0) | (rd1, td1) | (rd1, td0) | (rd1, td1) |

| (rd0, td0) | (rd0, td1) | (rd0, td0) | (rd0, td1) |
| (rd1, td0) | (rd1, td1) | (rd1, td0) | (rd1, td1) |
| (rd0, td0) | (rd0, td1) | (rd0, td0) | (rd0, td1) |
| (rd1, td0) | (rd1, td1) | (rd1, td0) | (rd1, td1) |

Fig. 1

COMMUNICATION TECHNIQUES EXPLOITING SPIRAL-BASED WAVEFORM DESIGN FLEXIBILITY

CROSS-REFERENCE TO RELATED APPLICATIONS

This application claims priority to U.S. Provisional Patent Application No. 62/084,770 filed Nov. 26, 2014 and entitled COMMUNICATION TECHNIQUES EXPLOITING SPIRAL-BASED WAVEFORM DESIGN FLEXIBILITY, the entire contents of which are hereby incorporated by reference.

BACKGROUND

Existing signal modulation techniques are typically based around complex circles. Standard circle-based signal modulation techniques, such as Quadrature Amplitude Modulation (QAM) and Phase-Shift Keying (PSK), use some combination of Amplitude Modulation (AM), Frequency Modulation (FM) and Phase Modulation (PM). QAM, for instance, combines AM and PM.

However, spiral-based signal modulation exists as an alternative to circle-based signal modification. As such, there is a need for useful and novel applications of spiral waveform design flexibility.

SUMMARY

One exemplary embodiment can describe a method for communicating. This can include identifying a set of non-linear functions used to generate waveforms; generating, a plurality of waveforms having substantially identical amplitudes and substantially identical phases, and designating this plurality of waveforms as a plurality of reference signals; encoding at least one bit of traffic data in an attribute of a waveform; selecting a reference symbol ("refbol") that encodes the at least one bit of traffic data; transmitting the refbol as a waveform from a transmitter; receiving the refbol at a receiver; and decoding the refbol.

Another exemplary embodiment can describe another method for communicating. This can include identifying a set of nonlinear functions used to generate a plurality of waveforms, each waveform having a phase and at least one binary attribute; separating the plurality of waveforms into a plurality of waveforms having even phases and a plurality of waveforms having odd phases; selecting from the plurality of waveforms having even phases a plurality of waveforms having one value of the at least one binary attribute; selecting from the plurality of waveforms having odd phases a plurality of waveforms having the opposite value of the at least one binary attribute; combining the selected pluralities of waveforms into a waveform alphabet; assigning a unique numeric code to each of the waveforms in the waveform alphabet; transmitting a numeric sequence as a series of the waveforms in the waveform alphabet; receiving the series of transmitted waveforms; and decoding the series of transmitted waveforms.

Another exemplary embodiment can describe another method for communicating. This can include identifying a set of nonlinear functions used to generate a plurality of waveforms, each waveform having at least one binary attribute; separating the plurality of waveforms into a plurality of waveforms having a first value of the at least one binary attribute and a plurality of waveforms having a second value of the at least one binary attribute; assigning a unique numeric code to each of the waveforms in the plurality of waveforms having the first value of the at least one binary attribute; assigning a numeric code to each of the waveforms in the plurality of waveforms having the second value of the at least one binary attribute; transmitting a numeric sequence on a first channel as a first series of waveforms having the first value of the at least one binary attribute; transmitting a numeric sequence on a second channel as a second series of waveforms having the second value of the at least one binary attribute; receiving at least one of the first series of waveforms and the second series of waveforms; and decoding at least one of the first series of waveforms and the second series of waveforms.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIG. 1 may show exemplary combinations of rotational direction and time direction used by a transmitter.

DETAILED DESCRIPTION OF THE EMBODIMENTS

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Prior patents issued to Applicants, including U.S. Pat. Nos. 8,472,534 and 8,861,327, the contents of which are herein incorporated by reference, introduced spiral-based signal modulation, which bases signal modulation on complex spirals, rather than the traditional complex circles used by standard signal modulation techniques such as Quadrature Amplitude Modulation (QAM) and Phase-Shift Keying (PSK).

A fundamental benefit of spiral-based signal modulation is that it greatly expands the waveform design space. In addition to AM, FM and PM, spiral-based signal modulation may support three new degrees of freedom: Intra-Symbol Complex Amplitude Modulation (ISCAM), time reversal (TR), and rotational reversal (RR). An illustrative calculation of how much more symbol waveform design flexibility this provides is given in Applicants' U.S. patent application Ser. No. 14/200,220, the contents of which are incorporated herein by reference.

According to an exemplary embodiment, the most direct application of this additional spiral waveform design flexibility may be to maximize symbol waveform differentiation, in order to increase resistance to random Additive White Gaussian Noise (AWGN). For AWGN channels, the optimal strategy may be to maximize symbol waveform distinguishability across the symbol waveform alphabet set. However, there are other useful and novel applications of spiral waveform design flexibility.

According to an exemplary embodiment, one such application of spiral waveform design flexibility may be to use a "partial Cartesian product" to design symbol waveform alphabets. According to such an exemplary embodiment, this may allow symbol waveform alphabets to be designed that are resistant to correlated channel impairments.

To lay some foundation, a (full) Cartesian product (also called a "Cartesian cross") of two sets generates all possible pairs of set elements, where one element is taken from each set. For instance, the Cartesian product of the sets {a, b} and {c, d} is {(a,c), (a,d), (b,c), (b,d)}.

For example, looking at a standard QAM constellation diagram, such a diagram can be viewed as the Cartesian product of a phase set with an amplitude set. For instance, in a circular 16-QAM implementation with eight phases and two amplitude levels, the constellation diagram could be represented as the Cartesian product of the phase set P={p0, p1, p2, p3, p4, p5, p6, p7} with the amplitude set A={a0, a1}, producing Q={(p0, a0), (p0, a1), (p1, a0), (p1, a1), (p2, a0), (p2, a1), (p3, a0), (p3, a1), (p4, a0), (p4, a1), (p5, a0), (p5, a1), (p6, a0), (p6, a1), (p7, a0), (p'7, a1)}. There are 16 of these points in all, and each element of Q is equivalent to one of the points that is located on the circular 16-QAM constellation diagram.

However, as compared to QAM or other circle-based techniques, spiral-based signal modulation has a much bigger symbol waveform design space. This means that, according to an exemplary embodiment, a system using spiral-based signal modulation can generate much more varied Cartesian products.

For instance, an exemplary spiral-based symbol waveform alphabet could be designed with eight phases, P={p0, p1, p2, p3, p4, p5, p6, p7}, two amplitude values A={a0, a1}, two rotational directions, R={rd0, rd1}, two time directions, T={td0, td1}, and four geometric growth values, G={g0, g1, g2, g3}. A full Cartesian product of these five sets would have 8·2·2·2·4=256 elements: for instance, one element would be (p0, a0, rd0, td0, g0).

However, according to an exemplary embodiment, a partial Cartesian product including only a fraction of the full Cartesian product may be used instead of the full Cartesian product. By deliberately removing certain combinations from the full Cartesian product, it is possible to strengthen communication capabilities in the presence of correlated channel impairments. Because spiral-based signal modulation has a much bigger symbol waveform design space than circle-based signal modulation techniques, it may be possible to impose such a restriction without a significant loss in performance.

A variety of applications of this technique may be envisioned. For example, according to one exemplary embodiment, a spiral-based signal modulation technique may be envisioned wherein reference signals are also used to carry traffic. This may result in improved rates of data transfer and thus improved performance.

Reference signals are a type of signal that may be employed in telecommunications systems for a variety of purposes. For example, reference signals may be used for frequency and time synchronization, signal power estimation, signal quality measurements, and/or channel estimation. These may collectively be called "meta communication" between the transmitter and the receiver. In current practice, reference signals carry no traffic; that is, no "useful" information is transmitted via reference signal by the users of the channel.

However, in some cases (like when using spiral-based signal modulation), certain properties of the reference signal may not be necessary for meta communication. According to an exemplary embodiment, reference signals can additionally be used to carry traffic, by harnessing those properties of the reference signal that are not necessary for meta communication. This may be facilitated by the rich spiral waveform design space. The term "refbol", a combination of "reference signal" with "symbol", is here introduced to describe reference signals which also carry traffic (as do the symbols in a communication alphabet).

According to an exemplary embodiment, when communicating on a given channel, for channel estimation purposes known reference signals may be sent at known times in order to characterize channel amplitude attenuation and phase distortion. However, for this to work, the transmitted amplitude and phase must be known ahead of time by the receiver, and therefore traffic cannot be carried in these waveform parameters.

For communication based solely on amplitude modulation and phase modulation (as with QAM), the need to use a specific amplitude and phase that are known ahead of time by the receiver means that the reference signal can carry no traffic. However, for spiral-based signal modulation, additional waveform parameters may be available to carry traffic. According to an exemplary embodiment, an alphabet of refbols may be created that all have known amplitude and phase (satisfying the reference signal requirement) but which also transmit traffic in other waveform parameters. As an exemplary implementation, one bit may be carried in each of the waveforms' rotational and time directions. In this exemplary implementation, each refbol may therefore carry two traffic bits, rather than the zero traffic bits carried by reference signals using current technology; this may result in improved performance.

According to an exemplary embodiment, standard LTE single antenna port transmission may be used. With standard LTE single antenna port transmission, 4/84 resource elements (the smallest time-frequency domains that can be used for transmission) are devoted to common reference signals, implying a 4.8% loss of data throughput. LTE can run as low as 2 bits per resource element (when configured for QPSK), and as high as 6 bits per resource element (when configured for 64-QAM). In these two extremes, the potential data throughput gains from using refbols with two bits of traffic data each, as described in the exemplary implementation above, would be 4.8% and 1.6%, respectively.

Other performance improvements may also be possible. According to an exemplary embodiment, spiral modulation may be engineered for a high number of samples per received symbol or refbol, for example due to AWGN advantages and other considerations. According to such an embodiment, it may be possible to make a particularly good SINR measurement from a single received refbol. Since the amplitude and phase trajectory of the refbol may be known, the deviation of each of the samples from the expected value can be obtained. This may provide a good picture of what type of noise is present, on a per-refbol basis, and may allow compensation at the receiver (fast loop) or feedback to the transmitter to pre-correct or pre-distort (slow loop). According to such an exemplary embodiment, the transmitter feedback can also be used for adaptive modulation and coding purposes, to adjust coding, or select a larger or smaller symbol set, in response to varying channel quality feedback, as desired.

According to an exemplary embodiment, another potential application of this technique may be to reduce phase noise. "Phase noise" is a phenomenon caused by rapid, short-term random fluctuations in the phase of a waveform. Modulation techniques which make use of phase information may experience "phase noise" due to problems which may include clock synchronization uncertainty, phase drift, and multipath interference.

In general, phase noise impairments are not randomly distributed; phase noise makes it particularly difficult for the receiver to distinguish between adjacent phase states. According to one exemplary embodiment, then, a partial Cartesian product could also be applied to mitigating phase noise.

According to an exemplary embodiment, the partial Cartesian product may be used to mitigate phase noise by generating a symbol alphabet in which all symbol waveforms with adjacent phases have opposite time direction information. An illustrative eight symbol alphabet could be characterized by, for example: A={(p0, rd0, td0), (p0, rd1, td0), (p1, rd0, td1), (p1, rd1, td1), (p2, rd0, td0), (p2, rd1, td0), (p3, rd0, td1), (p3, rd1, td1)}

This exemplary implementation may provide several advantages over a standard 8-PSK implementation, in which an 8-symbol alphabet is constructed based on 8 phases around a circle in the complex plane.

For example, one of the advantages of the foregoing exemplary embodiment of a partial Cartesian product is that it does not include any symbol waveforms with odd phase and even time direction, or even phase and odd time direction. Because of this, the receiver knows that if it detects a symbol waveform with odd phase and even time direction (e.g., (p1, rd0, td0)), or even phase and odd time direction (e.g., (p0, rd0, td1)) then it must have a reception error. A similar ability to detect errors is not built into 8-PSK, because any detectable phase could be an allowable symbol.

Another advantage of the foregoing exemplary embodiment may be that, because of the partial Cartesian product, the receiver may be less likely to make an error in phase. Because of the difference in time direction information, adjacent phase states may be easier to distinguish from each other, making such errors less likely.

It may also be noted that, as an additional benefit of the flexibility of spiral-based waveform design, the likelihood of a phase error may be further reduced compared to 8-PSK because the exemplary implementation has only 4 phases, rather than 8. This may make the phases easier to distinguish than for 8-PSK, reducing one potential source of error. This is accomplished in the exemplary implementation by moving one bit from phase encoding to rotational direction encoding.

According to another exemplary embodiment, another application of this technique may be to reduce signal interference. In many communication applications, the limiting factor on performance is coherent interference from other signals. In some cases, this may be due to signals in adjacent frequency channels; in other cases, it may be from signals sharing the same frequency range either inappropriately or because of a shared unlicensed band. In still other cases, it may be from spatially adjacent channels, notably in the case of multilayer MIMO in which the spatial separation may not be fully resolved by standard MIMO techniques. Other sources of interference may also be envisioned.

In all of these cases where there is interference from other signals, a partial Cartesian product as described above may be used in an exemplary embodiment in order to improve communication performance. According to such an exemplary embodiment, communication performance can be improved by, for example, selecting waveform designs that facilitate distinguishing the signal of interest from the interfering signal(s).

There are two important and distinguishable cases that each may warrant a different exemplary application of this technique. In the first case, all signals are under the control of one party. In such a case, the signals can be jointly designed to facilitate distinguishing between them. This may occur if, for example, signals are being sent in parallel over adjacent frequency channels, or in multilayer MIMO with spatially adjacent channels, or in other circumstances with all signals under the same administrative control, as desired.

Under these conditions, the partial Cartesian product technique described above for combatting phase noise can be applied across the symbol alphabets for the different channels, so that some waveform characteristic is different between interfering channels. For instance, frequency- or spatially-adjacent channels may be configured so that each uses only one time direction, or only one rotational direction. This facilitates the receiver's task of separating out its intended signal from interference.

If necessary, this technique can be extended to distinguish between a two (or more) dimensional grid of interfering signals, for instance in the case of a spatial array of transceivers.

For instance, in an illustrative 4×4 spatially multiplexed channel configuration, the corresponding communication alphabets transmitted over each channel could have symbol waveforms constructed such that each transmitter will use only the combinations of rotational direction and time direction shown in exemplary FIG. 1.

Here, as shown in FIG. 1, no two spatially adjacent channels will receive symbol waveforms that have both the same time direction and the same rotational direction. This may ensure that spatially adjacent channels can be distinguished from one another.

However, in the second important case to consider, not all signals may be under the control of one party. Consequently, it may be impossible for them to be jointly designed to facilitate distinguishing between them. For example, a first frequency band may be located between two adjacent frequency bands (a second and a third frequency band) controlled by other parties.

In this situation, the partial Cartesian product approach cannot be applied as described above, because there is no design freedom over adjacent channels. However, according to an exemplary embodiment, the effect of a partial Cartesian product can be approximated by designing into the waveforms to be transmitted over the first frequency band a characteristic which is markedly different from the characteristics of the waveforms in the adjacent channels (the second and third frequency bands). As an exemplary implementation, if the waveforms in the adjacent channels are based on standard sinusoidals, one may choose to design our waveforms with a high growth parameter g, implying a markedly exponential aspect to the waveforms that contrasts markedly from standard symbol waveform sinusoidals. This may allow the spiral waveform to be readily distinguished from the standard sinusoidals.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for communicating data, comprising:
   encoding, by a transmitter, at least one bit of traffic data in an attribute of a waveform;
   selecting, by the transmitter, a refbol from a plurality of reference signals,
   wherein the plurality of reference signals comprises a plurality of waveforms having substantially identical amplitudes and substantially identical phases generated from a set of nonlinear functions used to represent at least one of increasing and decreasing spirals in a complex plane and corresponding to the cosine and sine components of said spirals, and
   wherein the refbol has the attribute encoded with the at least one bit of traffic data;
   transmitting a signal comprising the refbol from the transmitter;
   receiving the signal comprising the refbol at a receiver;
   decoding the refbol at the receiver;
   comparing, at the receiver, the amplitude and phase of the received refbol and an expected amplitude and expected phase, wherein the expected amplitude and expected phase are the amplitude and phase shared by the plurality of reference signals;
   measuring, at the receiver, a deviation between the amplitude and phase of the received refbol and the expected amplitude and expected phase: and
   compensating, at the receiver, for the measured deviation.

2. The method of claim 1, wherein the attribute of the waveform comprises at least one of: a rotational direction of the waveform and a time direction of the waveform.

3. The method of claim 1, further comprising sending feedback from the receiver to the transmitter characterizing the measured deviation.

4. The method of claim 3, further comprising performing at least one of: performing pre-correction at the transmitter, performing pre-distortion at the transmitter, performing adaptive modulation at the transmitter, adjusting the coding at the transmitter, selecting a larger symbol set at the transmitter, or selecting a smaller symbol set at the transmitter.

5. A communication system comprising:
   a transmitter, the transmitter configured to:
   encode at least one bit of traffic data in an attribute of a waveform;
   select a refbol from a plurality of reference signals,
   the plurality of reference signals comprising a plurality of waveforms having substantially identical amplitudes and substantially identical phases generated from a set of nonlinear functions used to represent at least one of increasing and decreasing spirals in a complex plane and corresponding to the cosine and sine components of said spirals, and
   wherein the refbol selected by the transmitter is a reference signal having the attribute of the waveform encoded with the at least one bit of traffic data; and
   transmit a signal comprising the refbol;
   a receiver, the receiver configured to:
   receive the signal comprising the refbol;
   compare the amplitude and phase of the refbol with an expected amplitude and expected phase, wherein the expected amplitude and expected phase are the amplitude and phase shared by the plurality of reference signals;
   measure a deviation between the amplitude and phase of the received refbol and the expected amplitude and expected phase;
   compensate for the measured deviation in the refbol; and
   decode the refbol to obtain the at least one bit of traffic data.

* * * * *